United States Patent Office 3,376,045
Patented Apr. 2, 1968

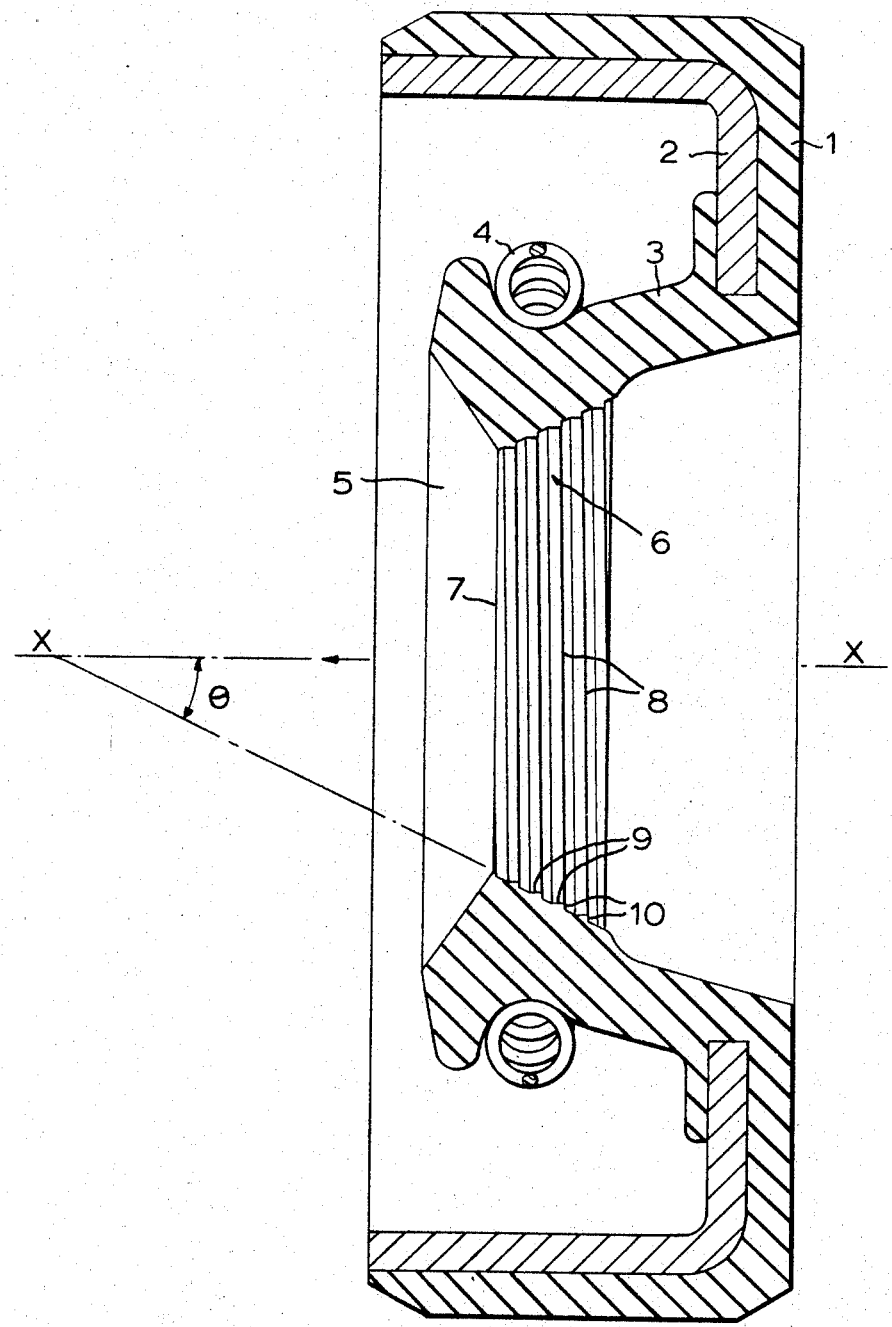

3,376,045
SHAFT SEALS
Ernest T. Jagger, Newcastle-upon-Tyne, England, assignor to George Angus & Company Limited, Newcastle-upon-Tyne, England, a British company
Filed Sept. 8, 1965, Ser. No. 485,720
Claims priority, application Great Britain, Sept. 24, 1964, 38,997/64
7 Claims. (Cl. 277—134)

ABSTRACT OF THE DISCLOSURE

A lip-type seal comprising a frusto-conical synthetic rubber ring, a surface of which ring forms a preferred conical angle with the seal axis, the ring being moulded with a screw thread to feed back oil, and a flank surface of the screw thread being substantially parallel to the seal axis.

---

This invention relates to shaft seals, also known as oil seals, designed for shafts, such as engine crankshafts, which are difficult to seal because of such factors as shaft deflection, torsional oscillation and eccentricity in motion.

It has long been known that the sealing of such shafts can be improved by providing at the sealed periphery some form of return feed screw, or feed-back scroll, formed by a helical ridge or groove on the shaft or seal surface. By suitable selection of the direction of the helix in relation to the normal direction of rotation of the shaft, the effect of relative rotation is to feed back oil tending to leak past the seal.

Seals with lips or bushes moulded with a screw thread are known but their manufacture is relatively difficult and expensive because each moulding must either be unscrewed from its die or "sprung out," relying on the resiliency of the rubber or like material from which the moulding is made. In the latter case also, tearing of mouldings is liable to occur.

It is also found that the screw threads which have been moulded in seals tend to trap oil sludge and dirt in use.

Both the above problems, in the manufacture and use of oil seals with moulded screw threads, have the same cause which is that the screw threads, formed as helical ridges or as grooves, in the known seals have presented projections or undercuts in both axial directions.

The present invention is based on the realisation that the above problems can be overcome by suitable design of a screw thread on a seal surface which can be simply withdrawn axially from a die.

According to the invention, in a shaft seal having a peripheral sealing lip or brush moulded from resilient material with a frusto-conical surface having a screw thread moulded thereon, the screw thread is of such cross-sectional shape that one flank thereof is substantially parallel with the seal axis.

Such a seal can be moulded by a die having a cavity from which the seal can be withdrawn by simple axial movement, in the direction opposite to the taper of the frusto-conical surface.

Preferably, the screw thread is of right-angled buttress form with the longer flank parallel to the seal axis and the shorter flank transverse thereto. With such a right-angled thread, or with an obtuse-angled thread, the sealing surface does not prevent any undercut shoulder or recess likely to trap sludge.

It is also preferably for the screw thread to be a multi-start thread, for example a four-start thread of 12 t.p.i. (turns per inch) for internal seals in the size range 2 inches to 6 inches inside diameter.

The angle of taper to the seal axis of the screw-threaded frusto-conical surface of the seal should be between 15° and 35°, preferably about 25°.

Most shaft seals are so-called internal seals, which are each held in a housing and have their inner periphery formed as the sealing periphery for wiping contact with the shaft, and the invention is primarily concerned with internal seals. It is however applicable to external seals which are mounted on the shafts and seal by wiping contact of their outer peripheries against surrounding housings.

An example of an internal shaft seal of the metal-insert, lip type, moulded from an oil-resistant synthetic rubber, for example a silicone rubber, is shown in axial section on the accompanying drawing.

As shown by the drawing, the seal consists of a moulded circular ring having an outer holding annulus 1, stiffened by a metal ring insert 2, and an inner flexible annular flange 3 embraced by a garter spring 4 and having a sealing lip formed by two frusto-conical surfaces 5 and 6 which converge inwardly towards the seal axis X—X to define a sealing lip edge 7.

The frusto-conical surface 6 is moulded with a multi-start screw thread 8 to serve as a feed-back screw for oil on relative rotation, in the appropriate direction, of a shaft on which the seal is used.

The screw thread 8 is of right-angled buttress form with the longer flank 9 parallel to the seal axis and the shorter flank 10 transverse thereto.

It can be seen that the seal illustrated can be moulded by a die having a cavity, forming the outer surface of the annulus 1 and the inner peripheral surface of the flange 3, from which the seal can be withdrawn by simple axial movement, in the direction indicated by the arrow on the axis line X—X opposite to the taper of the frusto-conical surface 6 and parallel to the longer flank 9 of the screw thread 8.

The angle $\theta$ of the taper of the frusto-conical surface 6 is 25°.

I claim:

1. In a shaft seal comprising a moulded synthetic rubber ring having a co-axial peripheral sealing lip with a co-axial frusto-conical surface having a screw thread moulded thereon, the improvement which consists in said screw thread having one flank surface thereof substantially parallel with the axis of said ring.

2. A shaft seal according to claim 1, in which said screw thread is of right-angled buttress form with the longer flank thereof parallel to said axis and the shorter flank transverse to said axis.

3. A shaft seal according to claim 2, in which said screw thread is a multi-start screw thread.

4. A shaft seal according to claim 3, in which said frusto-conical surface has an angle of taper to said axis of between 15° and 35°.

5. A shaft seal according to claim 4, in which said angle of taper is about 25°.

6. A shaft seal according to claim 1, in which said frusto-conical surface has an angle of taper to said axis of between 15° and 20°.

7. A shaft seal according to claim 6, in which said angle of taper is about 25°.

References Cited

UNITED STATES PATENTS 2,446,380  8/1948  Meyers et al. _____ 277—134 X

FOREIGN PATENTS 1,227,078  2/1960  France.
758,543  10/1956  Great Britain.

SAMUEL ROTHBERG, *Primary Examiner.*